Nov. 13, 1951  M. WATSON  2,575,149
VEGETABLE WASHING BASKET
Filed April 22, 1946
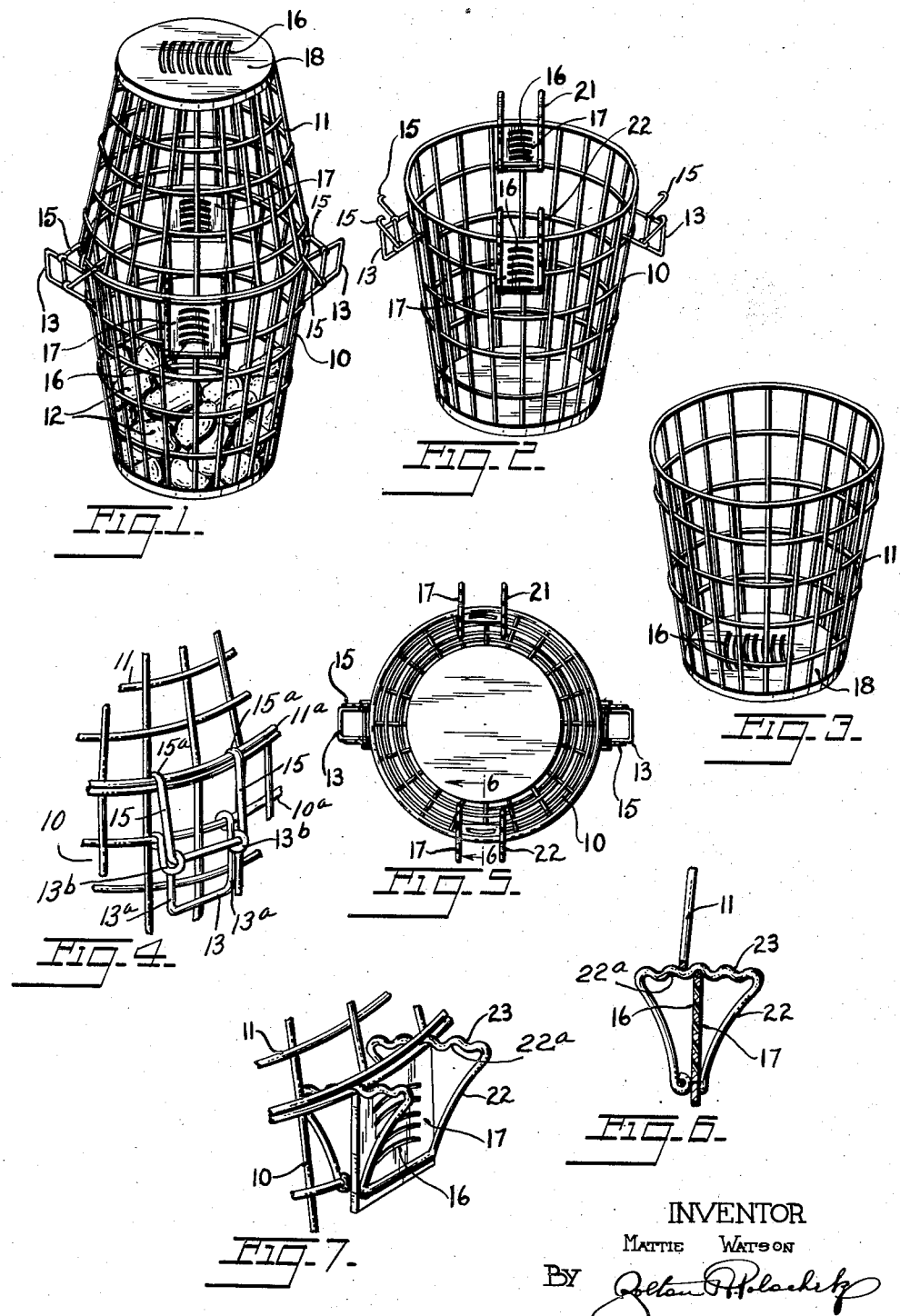
INVENTOR
MATTIE WATSON Patented Nov. 13, 1951

2,575,149

UNITED STATES PATENT OFFICE 2,575,149

VEGETABLE WASHING BASKET

Mattie Watson, New York, N. Y.

Application April 22, 1946, Serial No. 664,134

1 Claim. (Cl. 220—19)

This invention relates to vegetable baskets or containers adapted to contain the vegetables while the same are being stored and to be usable when effecting a cleaning operation upon the vegetables.

It is an object of the present invention to provide vegetable containers which are adapted to be fitted at their tops or open ends so that one of the containers forms a cover for the other container whereby the vegetables can be manipulated throughout a greater vertical distance when the containers are inverted to pass the vegetables from one basket to the other.

According to the invention, one basket is made with over center hinged loops at its top opening and adapted to pass through the loops of the other basket and brought through and down to an over center position to retain the baskets in locked engagement with one another. The bottom ends of the basket may be made of plate metal and provided with grating slits by means of which the vegetables can be grated when taken from the baskets and passed over the grating. A similar grating arrangement may be provided on the side of the basket. On opposite sides of the bottom basket and located respectively between the hinged loops are brackets extending into the basket and externally therefrom for supporting the upper basket and preventing the baskets from sliding into one another should the rims be distorted.

For further comprehension of the invention, and of the objects and advantages thereof, reference will be had to the following description and accompanying drawings, and to the appended claim in which the various novel features of the invention are more particularly set forth.

In the accompanying drawing forming a material part of this disclosure:

Fig. 1 is a perspective view of one basket assembled upon the other and containing vegetables to be washed.

Fig. 2 is a perspective view of the bottom basket shown in Fig. 1 containing the hinged side handles.

Fig. 3 is a similar perspective view of the top basket.

Fig. 4 is a fragmentary view of the baskets looking directly upon the locked handles.

Fig. 5 is a diagrammatic view looking into the top of the lower basket showing particularly the brackets for supporting the inverted top basket.

Fig. 6 is an enlarged fragmentary view partly in section taken on line 6—6 of Fig. 5 illustrating how the top basket is supported on the brackets of the lower basket.

Fig. 7 is an enlarged fragmentary perspective view showing how the bracket is constructed of wire and positioned on the basket.

Referring now to the figures, it will be noted that there are two baskets 10 and 11 of similar wire formation adapted to be connected together so that their opening portions cooperate to provide an enlarged enclosure for vegetables 12. The basket 10 is provided at opposite sides with U-shaped handles 13 having side arms 13ª which have their top ends curled about one of the horizontal bars 10ª of the basket 10. Intermediate of their ends, the side arms 13ª of the handles 13 are formed with eyes 13ᵇ. Vertically arranged hooks 15 have their bottom ends pivotally connected with the eyes 13ᵇ. The top ends of the hooks 15 are formed with hook portions 15ª engageable over the lowermost horizontal rod 11ª of the top inverted basket 11 for securing the baskets 10 and 11 together when the handles 13 are pivoted flush against the side of the lower basket 10, as shown in Fig. 4. By shaking the combined baskets, the vegetables 12 will pass from the bottom of one basket to the bottom of the other basket. By rolling the baskets, the vegetables will travel on the sides of the baskets.

The baskets 10 and 11 may have grating slits 16 located either in a sheet of metal 17 located at the top edge of the basket, or the bottom of the basket can be made of plate formation 18 bearing the slits 16.

Referring now to Fig. 5, there is shown a lower basket 10 in an upright position with the U-shaped handles 13 shown removed ninety degrees from supporting brackets 21 and 22 also mounted at the top of the lower basket 10 at opposite sides thereof. The brackets 21 and 22 are constructed, as shown more clearly in Fig. 7, from a single piece of wire and are shaped to straddle the edge of the basket 10. The top wire cross bars 22ª are indented in several places as indicated at 23 to more easily retain the cooperating edge of the inverted basket 11. By means of these brackets it is impossible for the top basket to enter the opening of the lower basket even though either of the baskets be somewhat bent or distorted about their rim. The indented portions 23 of the brackets 21 and 22 extend horizontally from both sides of the top edge of the basket and continue into portions extended downwardly at an angle and toward one another for connection at one of their ends with the sides of the basket 10, as shown in Figs. 6 and 7.

It will now be apparent that there has been provided a convenient arrangement, formed of two wire baskets for shaking, to effect the movement of the vegetables in the water being used to wash them. Each time the assembled baskets are inverted the vegetables will fall throughout substantially the height of two baskets and from the bottom of one basket to the bottom of the other basket.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A vegetable washing device, comprising a pair of wire baskets having open ends of equal circular size to abut against spaced brackets mounted over the top edge of one of the baskets, said brackets being provided with corrugated cross bars, the open end of the other basket being disposed against said cross bars, and loop handles pivoted to the basket carrying said brackets and provided with hook arms disposed in angular relation thereto to engage the other basket and pull the same into seating engagement with said corrugated cross bars.

MATTIE WATSON.

REFERENCES CITED

The following references are of record in the file of this patent:

UNITED STATES PATENTS

| Number | Name | Date |
|---|---|---|
| 800,679 | Rhoads | Oct. 3, 1905 |
| 899,084 | Thoits et al. | Sept. 22, 1908 |
| 903,634 | Troemel | Nov. 10, 1908 |
| 1,207,279 | Crum | Dec. 5, 1916 |
| 1,381,855 | Ashcraft | June 14, 1921 |
| 1,683,554 | Kenyon | Sept. 4, 1928 |
| 1,765,072 | Hashimoto | June 17, 1930 |
| 2,350,922 | Planeta | June 6, 1944 |

FOREIGN PATENTS

| Number | Country | Date |
|---|---|---|
| 365,283 | Great Britain | Jan. 21, 1932 |
| 605,399 | Germany | Nov. 9, 1934 |